(12) United States Patent
Rosenau et al.

(10) Patent No.: US 9,279,326 B2
(45) Date of Patent: Mar. 8, 2016

(54) METHOD FOR BALANCING AND ASSEMBLING A TURBINE ROTOR

(71) Applicant: Rolls-Royce Deutschland Ltd & Co KG, Blankenfelde-Mahlow (DE)

(72) Inventors: Knut Rosenau, Herzfelde (DE); Reinhold Hecken, Riesdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 95 days.

(21) Appl. No.: 14/455,391

(22) Filed: Aug. 8, 2014

(65) Prior Publication Data
US 2015/0047191 A1 Feb. 19, 2015

(30) Foreign Application Priority Data
Aug. 19, 2013 (DE) .......................... 10 2013 216 377

(51) Int. Cl.
| F01D 5/02 | (2006.01) |
| B23P 11/00 | (2006.01) |
| F01D 5/06 | (2006.01) |
| F04D 29/66 | (2006.01) |
| F16F 15/32 | (2006.01) |
| F04D 29/32 | (2006.01) |

(52) U.S. Cl.
CPC ................ F01D 5/027 (2013.01); B23P 11/00 (2013.01); F01D 5/066 (2013.01); F04D 29/321 (2013.01); F04D 29/662 (2013.01); F16F 15/32 (2013.01); F05B 2230/60 (2013.01); F05D 2260/34 (2013.01); Y10T 29/4932 (2015.01)

(58) Field of Classification Search
CPC ....... F01D 5/027; F01D 5/066; F04D 29/321; F04D 29/662; F16F 15/32; F05D 2260/34; F05B 2230/60; B23P 11/00; Y10T 29/4932
See application file for complete search history.

(56) References Cited

U.S. PATENT DOCUMENTS

| 4,586,225 A | 5/1986 | Bouiller et al. |
| 8,025,483 B2 | 9/2011 | Blanchard et al. |
| 2006/0053882 A1 | 3/2006 | Lee et al. |
| 2007/0059164 A1 | 3/2007 | Brault et al. |
| 2009/0025461 A1 | 1/2009 | Walters et al. |

FOREIGN PATENT DOCUMENTS

| CN | 203050800 | 7/2013 |
| DE | 102009014846 A1 | 10/2010 |
| FR | 2974865 | 11/2012 |

OTHER PUBLICATIONS

German Search Report dated Feb. 4, 2014 from counterpart application No. 10 2013 216 377.0.
European Search Report dated May 18, 2015 for related European patent application No. 14180043.3.

*Primary Examiner* — Moshe Wilensky
(74) *Attorney, Agent, or Firm* — Timothy J. Klima; Shuttleworth & Ingersoll, PLC

(57) ABSTRACT

A method for balancing and assembling a turbine rotor 2 including at least one turbine disk 3 and a compressor rotor 15 of a gas turbine. A front cover disk 6 is fastened by connections 10 to the turbine disk 3, and the turbine disk 3 is balanced together with the cover disk 6. The turbine disk 3 and the cover disk 6 are braced by a clamping device 19, 20. The bolted connections 10 are then removed and the turbine disk 3 and the cover disk 6 are connected to the compressor rotor 15 by bolted connections 10. The clamping device 19, 20 is then removed.

20 Claims, 5 Drawing Sheets

METHOD FOR BALANCING AND ASSEMBLING A TURBINE ROTOR

Figure 1:
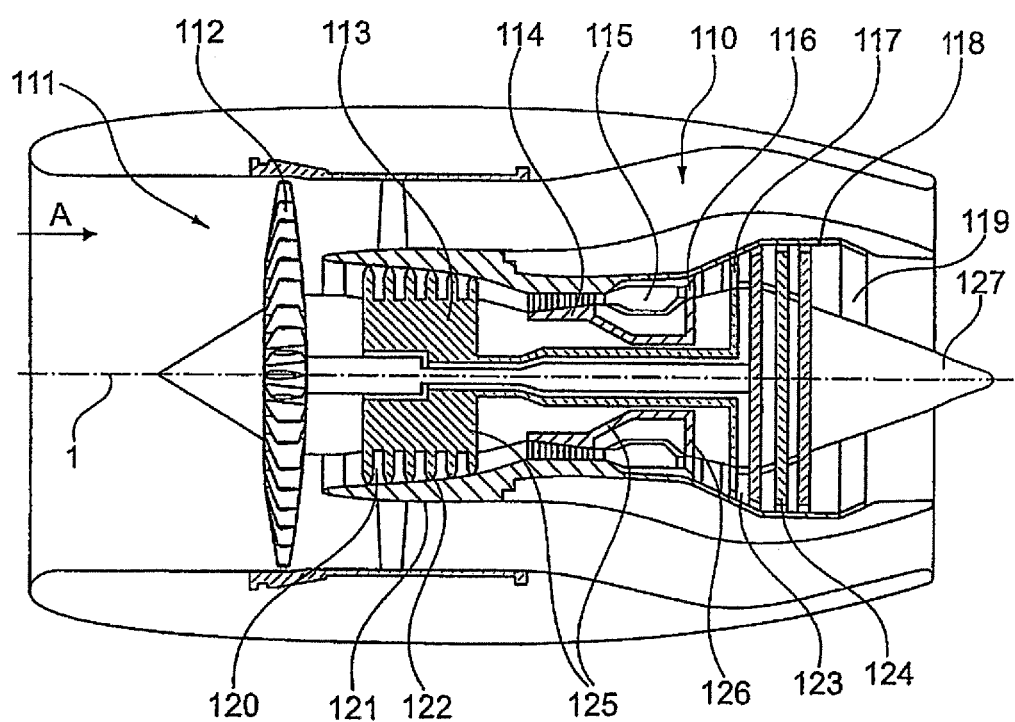

This application claims priority to German Patent Application No. DE102013216377.0 filed on Aug. 19, 2013, the entirety of which is incorporated by reference herein.

This invention relates to a method for balancing and assembling a turbine rotor of a gas turbine, in particular a turbine rotor including at least one turbine disk and a compressor rotor.

It is known from the state of the art that components of gas turbines rotating at considerable speeds must be balanced. In particular, partial components are separately balanced and then assembled. The state of the art shows here in particular bolted flange connections used to connect a turbine rotor and a compressor rotor. In many cases, these parts are press-fitted to one another. Furthermore it is known axially in front of the first turbine disk to provide a front cover disk to support-sealing elements and to route cooling air. This front cover disk in many cases is pre-assembled to the first turbine disk. This pre-assembled turbine rotor then is balanced, with balancing weights are fastened by pre-assembly bolts during balancing operation. These pre-assembly bolts remain at the turbine rotor during subsequent assembly, when the latter is then connected to the compressor rotor. An embodiment of this type is shown for example by US 2007/0059164 A1.

To enable balancing of the turbine rotor in the previously known design, bolting positions at the rotor flange are needed for the balancing bolts to fasten the balancing weights. These bolts are not disassembled after balancing, so they are subsequently not available to connect the turbine rotor to the compressor rotor. Instead, it is necessary to provide on this or at a second pitch circle additional recesses for bolted connections. This results in an increase in the overall diameter of the flange used for connection between the compressor rotor and the turbine rotor. A further disadvantage is that the additional bolts supporting the balancing weights result in additional parts with additional weight.

The overall outcome is a design which is unattractive for cost reasons and which, with additional weight, requires additional radial installation space.

The object underlying the present invention is to provide a method for balancing and assembling a turbine rotor and a compressor rotor of a gas turbine, which, while being simply designed, avoids the disadvantages of the state of the art and is characterized by high operational reliability.

It is thus provided in accordance with the invention that the method for balancing and assembling a turbine rotor with at least one turbine disk and a compressor rotor of a gas turbine first includes five steps.

In a first process step, a front cover disk is fastened by means of bolted connections to a turbine disk. Then the turbine disk is balanced together with the cover disk. Here, balancing weights are fitted at the bolted connections in suitable positions. Advantageously the bolting positions and the balancing weights can be numbered.

In a second step, the turbine disk together with the cover disk is then braced by means of a clamping device. The clamping device is therefore used to secure the turbine disk and the cover disk firmly and in a precise position relative to one another.

Once the turbine disk and the cover disk are now connected to one another by means of the clamping device, the bolted connections used in the first step are removed in accordance with the invention in a third step. In so doing, the balancing weights too are removed, while the positions of the bolted connections and the positions and sizes of the balancing weights are recorded and saved in suitable manner. It is advantageous to save the numbers of the balancing weights too.

In a fourth step of the method in accordance with the invention, the turbine disk and the cover disk, which are connected to one another by the clamping device, are connected to the compressor rotor by means of bolted connections. These bolted connections are made at the same flange at which the cover disk and the turbine disk are connected.

In a fifth step in accordance with the invention, the clamping device is subsequently removed.

In a particularly favourable development of the invention, it is provided that in a sixth step further bolted connections, possibly concealed by the clamping device, are fitted. On the circumference, therefore, all bolted connections for connecting the turbine rotor to the compressor rotor are available. The balancing operation and the bolts used for this do not affect the connection between the turbine rotor and the compressor rotor. It is therefore not necessary in accordance with the invention to provide on different pitch circles several bolted connections, which are used for balancing or assembly, in the area of the flange between the turbine rotor and the compressor rotor.

In a particularly favourable embodiment of the invention, it is provided that the clamping device is arranged radially inside on the turbine disk and on the cover disk. Due to the installation space provided for this purpose it is possible in simple manner to use and operate the clamping device. The flange usually facing radially inwards to the engine center axis for connecting the compressor rotor and the turbine rotor also offers the option of positioning the clamping device.

To simplify assembly, it is particularly favourable when the cover disk is connected by means of a press fit to the turbine disk.

It is thus possible in accordance with the invention, as mentioned, to perform balancing by attaching balancing weights to the bolted connections. This procedure is simple and inexpensive and is characterized by high efficiency.

To balance the compressor rotor, there are various options within the framework of the invention. The compressor rotor is usually separately balanced before connection to the turbine disk and the cover disk. This can be achieved by a separate balancing flange, on which bolts with balancing weights are provided. It is however also possible to use the flange of the compressor rotor, which is subsequently used for connection to the turbine disk and the cover disk, for balancing. Bolts which support balancing weights are used here too.

In the first-mentioned variant, it is possible in simple manner to bolt the compressor rotor to the turbine disk and to the cover disk and to reattach the balancing weights fitted during balancing of the turbine disk and cover disk.

If the flange of the compressor rotor was used for balancing, it is necessary to remove the bolts located there together with the balancing weights. Hence, the balancing weights used for balancing of the turbine disk and cover disk as well as the balancing weights used for balancing of the compressor rotor are removed. The sizes and positions of the balancing weights are, as mentioned above, saved in suitable manner before being removed. It is thus subsequently possible, based on the removed balancing weights of the compressor rotor and of the turbine disk with the cover disk to determine and fit the resultant balancing weights. The total number of the balancing weights then remaining will thus be lower than the previously provided separate balancing weights. The total mass may also be reducible.

The invention results in further advantages in addition to those described above. It is thus possible in accordance with the invention, to use the lowest possible flange diameter between compressor rotor and turbine rotor for force transmission between turbine rotor and compressor rotor, and to do so to use all possible bolting positions. Furthermore the invention prevents, in comparison with the design described above and known from the state of the art, increased bearing stresses on the larger flange holes in the compressor flange at the bolting positions of the bolted connections used for pre-assembly of the cover disk and of the first turbine disk.

Figure 2:
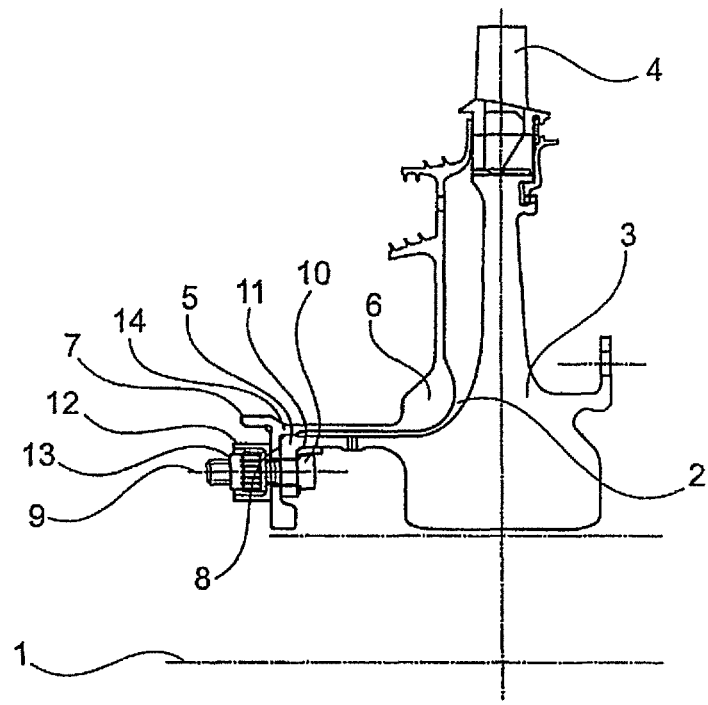
Figure 3:
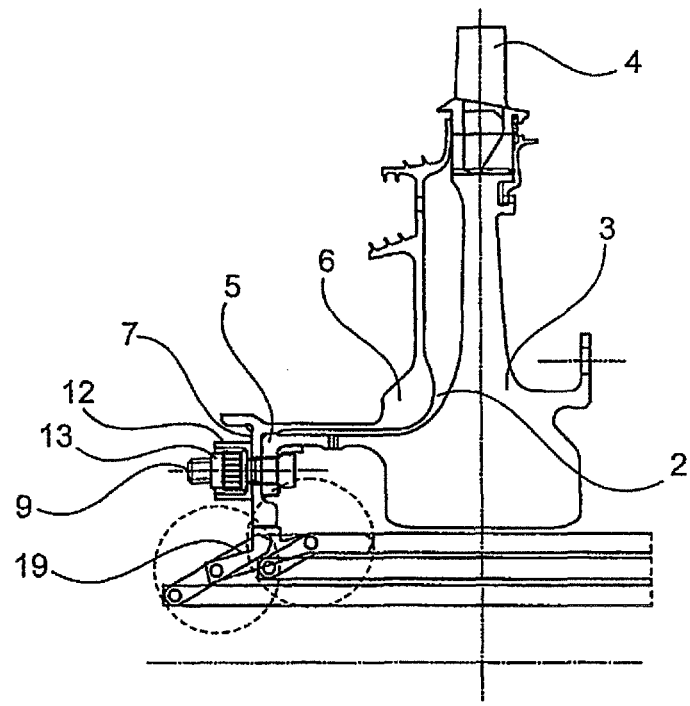
Figure 4:
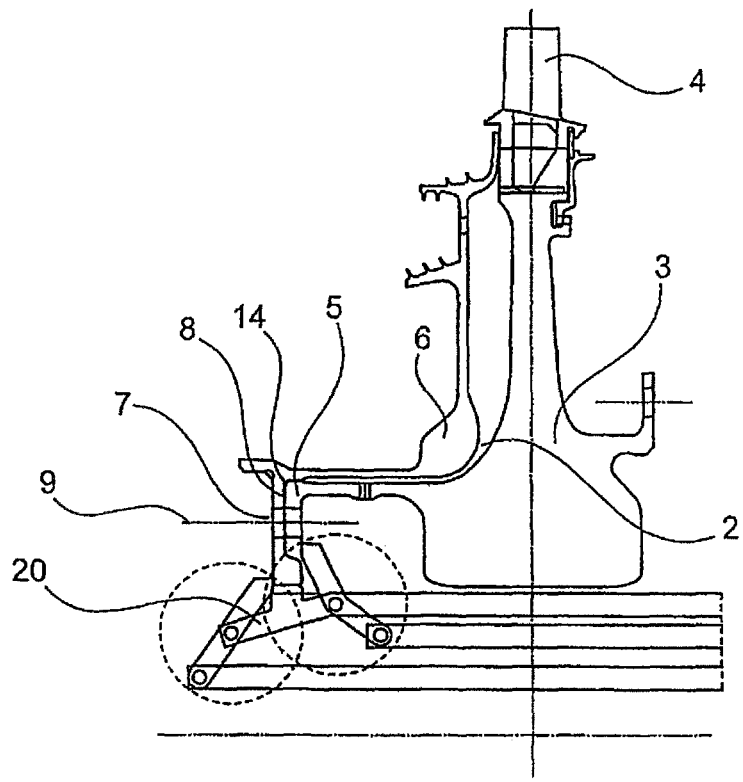
Figure 5:
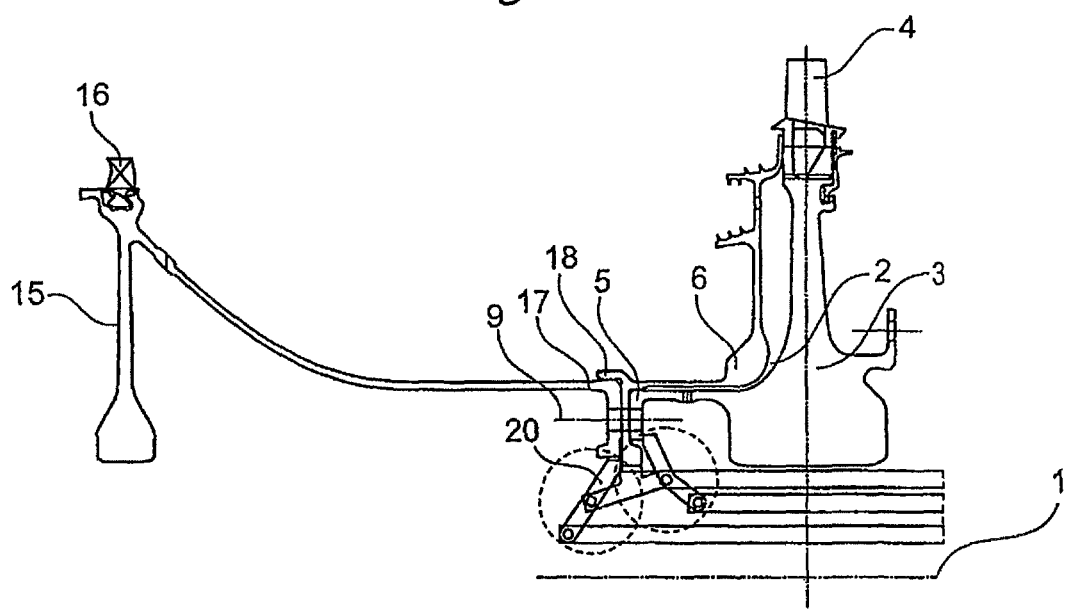
Figure 6:
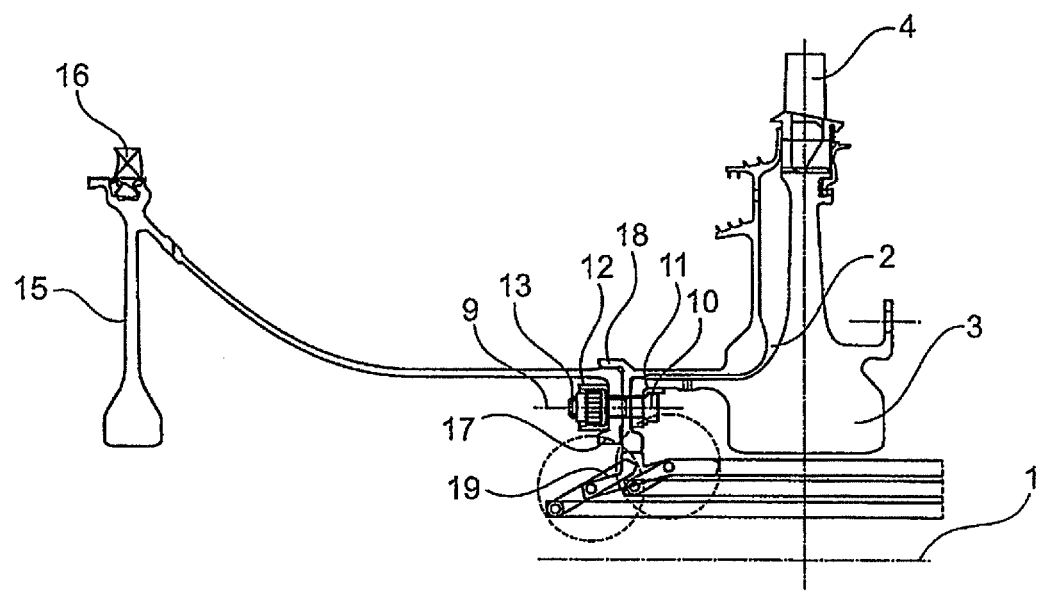
Figure 7:
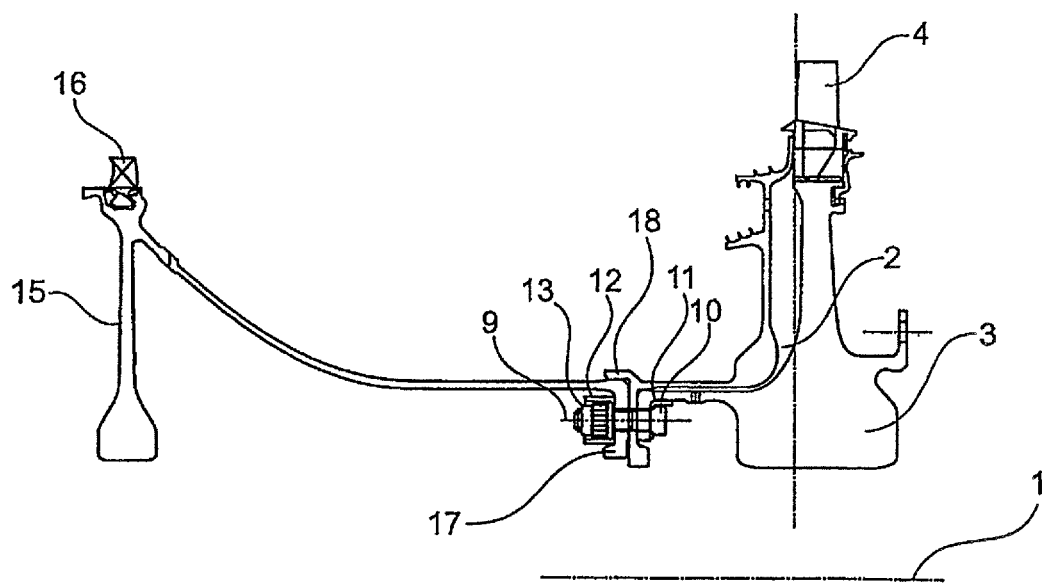
Figure 8:
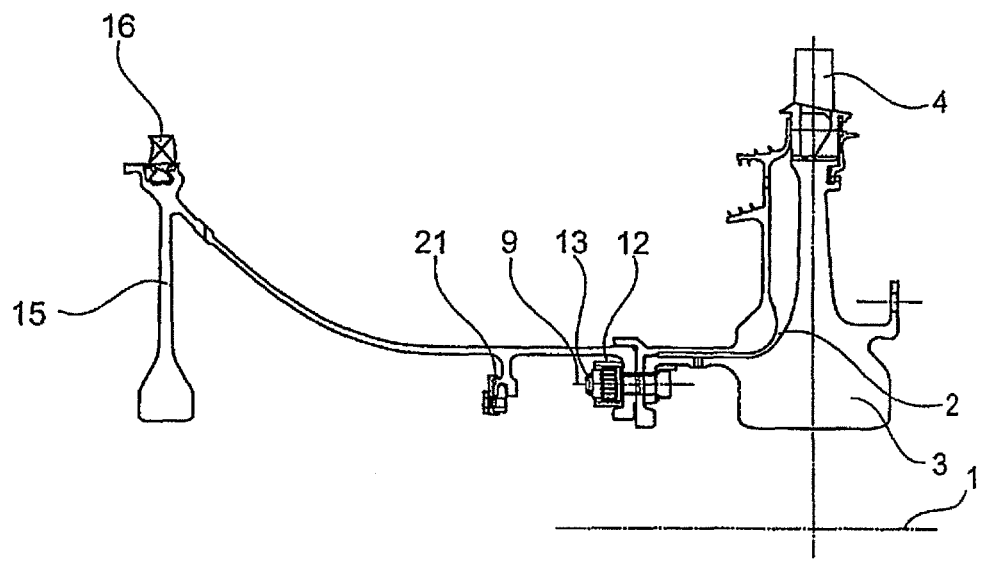
Figure 9:
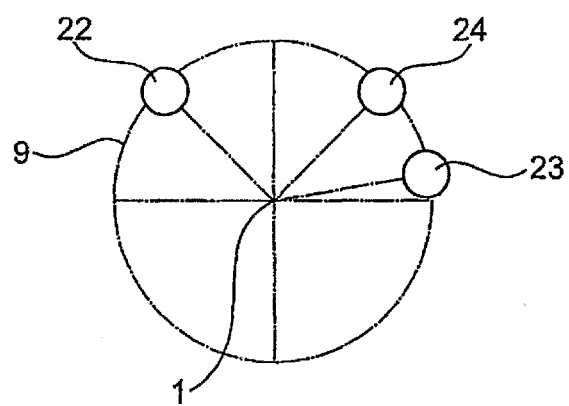

The present invention is described in the following in light of the accompanying drawings, showing exemplary embodiments. In the drawings, FIG. 1 shows a schematic representation of a gas-turbine engine in accordance with the present invention, FIG. 2 shows a schematic partial sectional view of the state in the first process step of the invention, FIG. 3 shows a view, by analogy with FIG. 2, in the second step of the process sequence, FIG. 4 shows a view, by analogy with FIGS. 2 and 3, in the third process step, FIG. 5 shows a view, by analogy with FIGS. 2 to 4, in the fourth process step with pre-assembled compressor rotor and braced clamping device, FIG. 6 shows a representation, by analogy with FIG. 5, in the fifth process step in the assembled state with opened clamping device, FIG. 7 shows a representation, by analogy with FIGS. 5 and 6, of an embodiment in a development of the invention, without separate downstream compressor balancing plane, FIG. 8 shows a representation of a modified exemplary embodiment, by analogy with FIG. 7, with separate downstream compressor balancing plane of the compressor rotor, and FIG. 9 shows a simplified radial sectional view of different balancing positions.

The gas-turbine engine 110 in accordance with FIG. 1 is a generally represented example of a turbomachine where the invention can be used. The engine 110 is of conventional design and includes in the flow direction, one behind the other, an air inlet 111, a fan 112 rotating inside a casing, an intermediate-pressure compressor 113, a high-pressure compressor 114, a combustion chamber 115, a high-pressure turbine 116, an intermediate-pressure turbine 117 and a low-pressure turbine 118 as well as an exhaust nozzle 119, all of which being arranged about a central engine center axis 1.

The intermediate-pressure compressor 113 and the high-pressure compressor 114 each include several stages, of which each has an arrangement extending in the circumferential direction of fixed and stationary guide vanes 120, generally referred to as stator vanes and projecting radially inwards from the engine casing 121 in an annular flow duct through the compressors 113, 114. The compressors furthermore have an arrangement of compressor rotor blades 122 which project radially outwards from a rotatable drum or disk 125 linked to hubs 126 of the high-pressure turbine 116 or the intermediate-pressure turbine 117, respectively.

The turbine sections 116, 117, 118 have similar stages, including an arrangement of fixed stator vanes 123 projecting radially inwards from the casing 121 into the annular flow duct through the turbines 116, 117, 118, and a subsequent arrangement of turbine blades 124 projecting outwards from a rotatable hub 126. The compressor drum or compressor disk 125 and the blades 122 arranged thereon, as well as the turbine rotor hub 126 and the turbine rotor blades 124 arranged thereon rotate about the engine center axis 1 during operation.

FIGS. 2 to 5 each show in a simplified sectional view a turbine rotor 2 with a first turbine disk 3. The reference numeral 4 indicates a turbine blade. The turbine disk 3 includes a turbine flange 5, on which a front cover disk 6 is arranged, preferably by means of a press fit. FIG. 2 shows an assembled and balanced state. Bolts 10 are provided here on a flange 7 of the front cover disk 6 through suitable passage openings which also extend through a compressor/turbine flange 8, with the head surface of said bolts being provided with the reference numeral 11, said bolts being arranged on a pitch circle diameter 9 (see also FIG. 9). The bolts 10 are provided with balancing weights 12 which are secured by means of nuts 13. Reference numeral 14 shows the above mentioned radial press fit between the turbine flange 5 and the flange 7 of the cover disk 6.

FIG. 2 thus shows the pre-assembled and balanced state according to process step 1.

FIG. 3 shows the second process step in which a clamping device 19 is inserted in the opened state through a centric recess or hole in order to brace the flange 7 of the cover disk 6 and the turbine flange 5 against one another, as is illustrated in FIG. 4 in the third process step. FIG. 4 shows that the bolts 10 have been removed together with the balancing weights 12.

FIG. 5 shows that a compressor rotor 15 provided with compressor blades 16 is positioned when the clamping device 20 is braced. This rotor has a compressor flange 17, which is also provided with passage openings for the bolts 10.

FIG. 6 shows the fifth process step, in which the bolts 10 together with the suitable balancing weights 12 have been fitted. The clamping device 19 is shown in the opened state and can then be removed.

FIG. 7 shows a design variant in which no additional balancing flange is provided on the compressor rotor 15. The latter is instead balanced in a way that the bolts 10 with balancing weights 12 are pre-assembled at the compressor flange 17. These bolts are, according to the fourth step shown in FIG. 5, removed once the position and size of the balancing weights 12 have been saved, in order to achieve the assembly shown in FIG. 6. FIG. 7 thus shows the finally assembled state, which will be described in the following in connection with FIG. 9.

FIG. 9 shows a pitch circle 9 on which balancing weights 12 of the turbine rotor 2 are depicted at circumferential positions 22, and balancing weights 12 of the compressor rotor 15 are depicted at circumferential positions 23. These are the saved and recorded positions from the previous balancing operation. From these circumferential positions 22 and 23, resultant circumferential positions 24 and sizes of the balancing weights 12, which replace the balancing weights 12 at the positions 22 and 23, can then be calculated.

FIG. 8 shows a modified embodiment, by analogy with FIG. 7, where (reference numeral 21) a separate downstream compressor balancing plane is provided on which additional balancing weights can be fitted. These can subsequently remain on the overall structure, or, as described in FIG. 9, be replaced by resultant balancing weights 12.

Summarizing then, the following can be stated:

The present invention uses all bolting positions on the pitch circle 9 of the compressor/turbine flange 8 for force transmission between the first turbine disk 3 and the compressor rotor 15.

This is achieved in the first step in that the front cover disk 6 is positioned by means of a press fit 14 relative to the first turbine disk 3 and attached to the compressor/turbine flange 8 using some or all bolts 10. Subsequently, the turbine rotor 2 is balanced.

In the second step, a clamping device 19 is inserted into the hole through the first turbine disk 3 and the hole in the flange of the front cover disk 6 after balancing, and the flange 7 of the front cover disk 6 and the turbine flange 5 are axially braced using the clamping device 19, 20.

In the third step, the bolts 10 on the compressor/turbine flange 8 are removed. The clamping device 20 prevents here any slippage of the front cover disk 6 on the press fit 14 between the turbine flange 5 and the flange of the front cover disk 6, and so prevents imbalances of the already balanced turbine rotor 2.

The turbine rotor 2 is fitted to the compressor rotor 15 in the fourth step for example by means of a press fit 18 or an axial coupling and by means of some or all bolts 10 on the compressor/turbine flange 8. In the fifth step, the clamping device 19 is removed and the bolting positions possibly concealed by the clamping device 20 on the pitch circle 9 are bolted in the sixth step using the bolts 10.

In a first embodiment, the compressor has a separate downstream balancing plane 21. In this case, the upstream balancing weights 12 are fitted during balancing of the turbine rotor 2 to the compressor/turbine flange 8. Before fitting of the turbine rotor 2 to the compressor rotor 15 these balancing weights 12 are removed. When fitting the turbine rotor 2 to the compressor rotor 15, the balancing weights 12 are again fitted at the original positions.

In an alternative embodiment, the compressor rotor 15 has no separate downstream balancing plane 21. In this embodiment, the compressor rotor 15 is balanced on the compressor/turbine flange 8 using balancing weights 12. The upstream balancing weights 12 are fitted to the compressor/turbine flange 8 when balancing the turbine rotor 2. Before fitting of the turbine rotor 2 to the compressor rotor 15, the balancing weights 12 are removed from the compressor rotor 15 and the turbine rotor 2. From the previous circumferential positions 22 of the balancing weights 12 on the turbine rotor 2 and from the previous circumferential positions 23 of the balancing weights 12 on the compressor rotor 15, the resultant balancing weights 12 on the compressor/turbine flange 8 and their resultant circumferential positions 24 are calculated, and the balancing weights 12 are fitted on the compressor/turbine flange 8 during fitting of the turbine rotor 2 to the compressor rotor 15.

LIST OF REFERENCE NUMERALS

1 Engine center axis
2 Turbine rotor
3 First turbine disk
4 Turbine blade
5 Turbine flange
6 Front cover disk
7 Flange of front cover disk
8 Compressor/turbine flange
9 Pitch circle diameter with bolting positions on compressor/turbine flange
10 Bolts on compressor/turbine flange
11 Head surface of bolts on compressor/turbine flange
12 Balancing weights on compressor/turbine flange
13 Nuts on compressor/turbine flange
14 Press fit between turbine flange and flange of front cover disk
15 Compressor rotor
16 Compressor blade
17 Compressor flange
18 Press fit between flange of front cover disk and compressor flange
19 Clamping device, opened
20 Clamping device, braced
21 Separate downstream compressor balancing plane
22 Circumferential positions of balancing weights 12 on turbine rotor 2
23 Circumferential positions of balancing weights 12 on compressor rotor 15
24 Resultant circumferential positions of balancing weights 12 on compressor/turbine flange
110 Gas-turbine engine/core engine
111 Air inlet
112 Fan
113 Intermediate-pressure compressor (compressor)
114 High-pressure compressor
115 Combustion chamber
116 High-pressure turbine
117 Intermediate-pressure turbine
118 Low-pressure turbine
119 Exhaust nozzle
120 Guide vanes
121 Engine casing
122 Compressor rotor blades
123 Stator vanes
124 Turbine blades
125 Compressor drum or disk
126 Turbine rotor hub
127 Exhaust cone

What is claimed is:

1. A method for balancing and assembling a turbine rotor including at least one turbine disk and a compressor rotor of a gas turbine, comprising:
    in a first step, fastening a front cover disk with first bolted connections to the turbine disk through first bolt holes, and balancing the turbine disk together with the cover disk,
    in a second step, immobilizing the turbine disk and the cover disk relative to each other with a clamping device,
    in a third step, removing the first bolted connections used in the first step,
    in a fourth step, connecting the turbine disk and the cover disk to the compressor rotor with second bolted connections through the first bolt holes, and
    in a fifth step, removing the clamping device.

2. The method in accordance with claim 1, and further comprising, in a sixth step, fitting further bolted connections, previously concealed by the clamping device.

3. The method in accordance with claim 1, and further comprising arranging the clamping device radially inside of the turbine disk and the cover disk.

4. The method in accordance with claim 1, and further comprising connecting the cover disk with a press fit to the turbine disk.

5. The method in accordance with claim 1, wherein the balancing is performed by attaching balancing weights at positions of the first bolted connections.

6. The method in accordance with claim 5, and further comprising balancing the compressor rotor before connection to the turbine disk and the cover disk at circumferential positions of the balancing weights on at least one chosen from the compressor rotor and a separate downstream compressor balancing plane, using balancing weights.

7. The method in accordance with claim 6, and further comprising removing the balancing weights used for balancing of the turbine disk and cover disk at the positions of the balancing weights on the turbine rotor before the compressor rotor is connected to the turbine rotor.

8. The method in accordance with claim 6, and further comprising removing the balancing weights at the circumferential positions of the balancing weights on the compressor rotor used for balancing of the compressor rotor before the compressor rotor is connected to the turbine rotor.

9. The method in accordance with claim 7, and further comprising determining and fitting resultant balancing weights at resultant circumferential positions on the turbine rotor based on the removed balancing weights at the circumferential positions of the balancing weights on the compressor rotor and the turbine disk connected to the cover disk.

10. The method in accordance with claim 2, and further comprising balancing the compressor rotor before connection to the turbine disk and the cover disk at circumferential positions of the balancing weights on at least one chosen from the compressor rotor and a separate downstream compressor balancing plane, using balancing weights.

11. The method in accordance with claim 10, and further comprising removing the balancing weights used for balancing of the turbine disk and cover disk at the positions of the balancing weights on the turbine rotor before the compressor rotor is connected to the turbine rotor.

12. The method in accordance with claim 11, and further comprising removing the balancing weights at the circumferential positions of the balancing weights on the compressor rotor used for balancing of the compressor rotor before the compressor rotor is connected to the turbine rotor.

13. The method in accordance with claim 12, and further comprising determining and fitting resultant balancing weights at resultant circumferential positions on the turbine rotor based on the removed balancing weights at the circumferential positions of the balancing weights on the compressor rotor and the turbine disk connected to the cover disk.

14. The method in accordance with claim 1, and further comprising balancing the compressor rotor before connection to the turbine disk and the cover disk at circumferential positions of the balancing weights on at least one chosen from the compressor rotor and a separate downstream compressor balancing plane, using balancing weights.

15. The method in accordance with claim 14, and further comprising removing the balancing weights used for balancing of the turbine disk and cover disk at the positions of the balancing weights on the turbine rotor before the compressor rotor is connected to the turbine rotor.

16. The method in accordance with claim 15, and further comprising removing the balancing weights at the circumferential positions of the balancing weights on the compressor rotor used for balancing of the compressor rotor before the compressor rotor is connected to the turbine rotor.

17. The method in accordance with claim 16, and further comprising determining and fitting resultant balancing weights at resultant circumferential positions on the turbine rotor based on the removed balancing weights at the circumferential positions of the balancing weights on the compressor rotor and the turbine disk connected to the cover disk.

18. The method in accordance with claim 3, and further comprising balancing the compressor rotor before connection to the turbine disk and the cover disk at circumferential positions of the balancing weights on at least one chosen from the compressor rotor and a separate downstream compressor balancing plane, using balancing weights.

19. The method in accordance with claim 18, and further comprising removing the balancing weights used for balancing of the turbine disk and cover disk at the positions of the balancing weights on the turbine rotor before the compressor rotor is connected to the turbine rotor.

20. The method in accordance with claim 19, and further comprising:
- removing the balancing weights at the circumferential positions of the balancing weights on the compressor rotor used for balancing of the compressor rotor before the compressor rotor is connected to the turbine rotor, and
- determining and fitting resultant balancing weights at resultant circumferential positions on the turbine rotor based on the removed balancing weights at the circumferential positions of the balancing weights on the compressor rotor and the turbine disk connected to the cover disk.

* * * * *